April 7, 1959 | S. EISLER | 2,880,649

EYEGLASSES FOR READING

Filed Feb. 23, 1955 | 2 Sheets-Sheet 1

INVENTOR.
SIDNEY EISLER

BY James and Franklin

ATTORNEYS

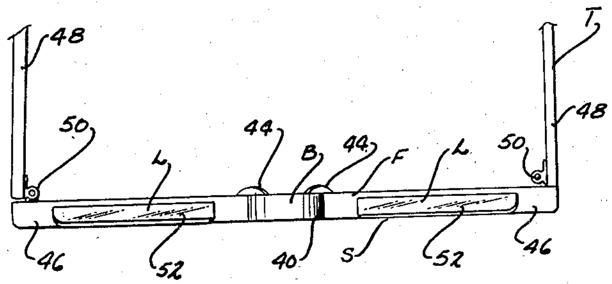
FIG. 5.
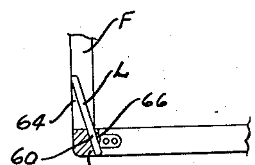
FIG. 8.
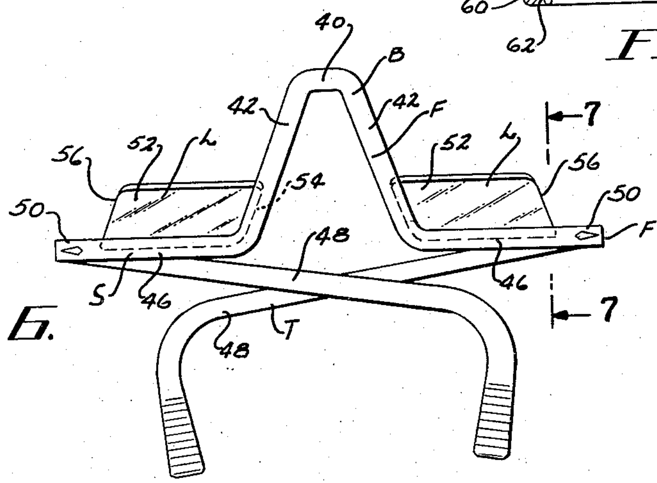
FIG. 6.
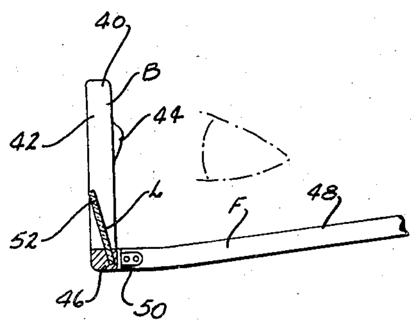
FIG. 7.
FIG. 9.
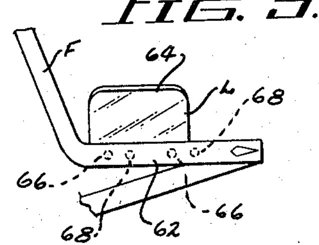
INVENTOR.
SIDNEY EISLER
BY James and Franklin
ATTORNEYS United States Patent Office 2,880,649

Patented Apr. 7, 1959

2,880,649

EYEGLASSES FOR READING

Sidney Eisler, New York, N.Y.

Application February 23, 1955, Serial No. 490,009

4 Claims. (Cl. 88—41)

This invention relates to eyeglasses, and more particularly to eyeglasses for people who want them mostly for close application (reading or close work), where a full glass would interfere with their distance vission or would be uncomfortable to them.

This is especially true of presbyopic people. Sometimes these people are fitted with bifocals, but that introduces unnecessary loss of clarity and comfort because the lens may be dirty or misted or have annoying reflections.

While the primary object of my invention is generally to improve eyeglasses for presbyopic people, for reading or close work, there are other objects of my invention which may not involve presbyopia. An example is people under forty years of age (not considered presbyopic), who may need help in work which is unusually close to their eyes—much closer than normal reading (usually considered to be about thirteen inches). Examples are a watchmaker, a stamp collector, an engraver, or a diamond merchant. These people, if fitted with ordinary working glasses, find their distance vision blurred, and thus find my invention a big improvement.

The watchmaker who now uses a jeweler's "loop" may use my glasses and obtain third dimension or stereoscopic vision, which he does not have with a "loop."

One object of the present invention is to overcome the foregoing disadvantage, which I do by providing eyeglasses with a narrow lens at the bottom for reading or close work, and with no lens at the top for distant vision. A more particular object is to provide such eyeglasses in which the lens is rimless at the top, so that there is no interference with vision at the transition line corresponding to the top edge of the lens.

Still another object is to provide distant vision at the sides of the lens, this being of value in going down steps or the like, and for this purpose the lens may be made rimless at the side edges as well as at the top edge.

In accordance with a further feature and object of my invention, the lenses are disposed at a substantial angle looking downward. This is possible because the lenses are used only for reading or close work. The angular disposition has the advantage that the lens is substantially perpendicular to the line of sight, and has the further advantage that for a given width of lens the top edge is lowered, thus increasing the range of distant vision.

To accomplish the foregoing objects, and others which will hereinafter appear, my invention resides in the eyeglass frame and lens elements, and their relation one to another as are hereinafter more particularly described in the following specification. The specification is accompanied by drawings in which:

Figure 5 is a plan view of a modification in which the frame is made of a plastics material;

Figure 6 is a front elevation of the same with the temples folded collaterally of the lenses;

Figure 7 is a vertical section taken approximately in the plane of the line 7—7 of Figure 6 but with the temples turned transversely of the lenses;

Figure 8 is a fragmentary section similar to Figure 7 but showing a modification;

Figure 9 is a fragmentary front elevation of the modification; and

Figure 2:
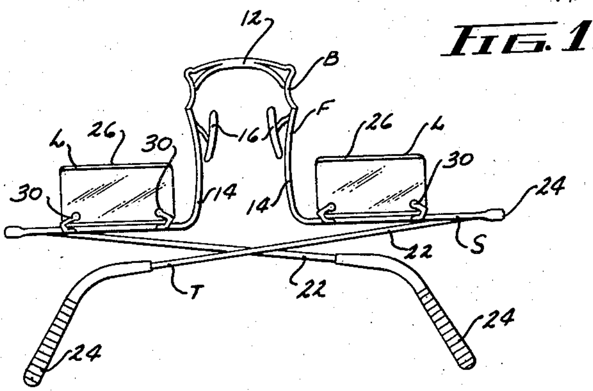
Figure 2 is a front elevation of the eyeglasses with the temples folded collaterally of the lenses.

Referring to the drawing, in all forms of the invention the eyeglasses comprise a frame generally designated F, carrying a pair of lenses L. The frame has a bridge B of unusually great depth, as is best shown in Figures 2 and 6. Differently expressed, the bridge has side members which come down to a level below the lenses L. There are generally horizontal lens support members S which extend outwardly, and terminate at their outer ends in hinges for temples T. The lenses L are quite narrow in vertical dimension, and are disposed above the lens support members S. This arrangement results in the lenses being rimless at the top and also at the outer edges, and if desired they may be rimless at the inner edges.

Figure 1:
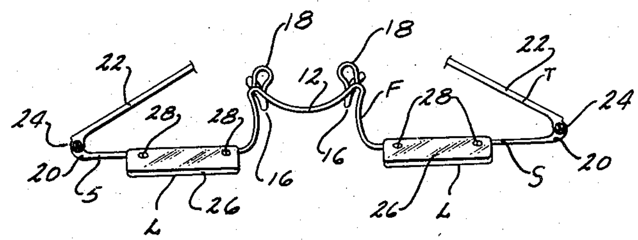
Figure 1 is a plan view of a pair of eyeglasses embodying features of my invention.
Figure 3:
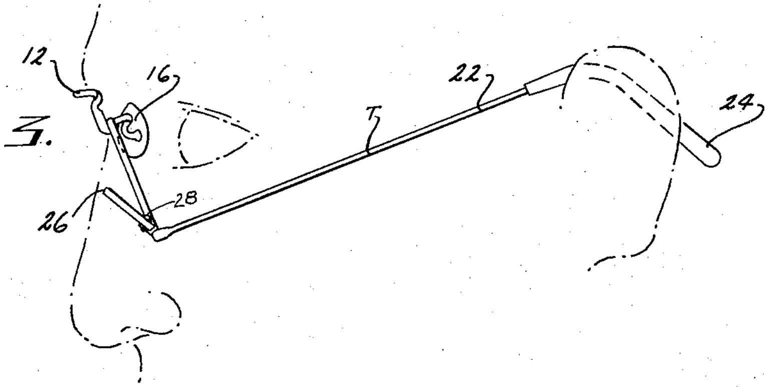
Figure 3 is a side elevation of the eyeglasses, with the temples turned outward as worn.

Considering the invention in greater detail, and referring now to Figures 1, 2 and 3 of the drawing, the frame F is made of metal. The bridge B comprises a top member 12 and side members 14. The latter may be provided with conventional self-adjustable pads 16, and these are preferably connected to the bridge through bendable connections 18 (Figure 1) so that the position of the pads may be altered by the optometrist to fit the nose of the wearer. The outwardly extending support members S may be straight except at the outer ends near the hinges, where they are preferably bent inward as shown at 20. These support members may be an integral continuous extension of the side members 14 of the bridge.

The temples 22 and their pivots or hinges 24 may be conventional. In the present case the temples are made of metal wire, terminating at their rear ends in pieces or hooks 24 made of a plastics material. However, it will be understood that if desired, the temples may be made entirely of wire, including hook portions to be received around the ears of the wearer.

In the present case the lenses 26 are rectangular with slightly rounded corners. Each lens has holes near its bottom edge through which mounting screws 28 pass. These screws are threadedly received in short support fingers 30 which project upwardly and forwardly from the support members S. It will be understood that with this arrangement some adjustment of the angle of the lens may be made by the optometrist, the change being made by bending the support fingers 30.

It will be seen from inspection of the drawing that the lens is rimless on the top and side edges, thus giving the wearer the maximum area or field of distance vision, while at the same time affording adequate area or field of close vision.

Figure 10:
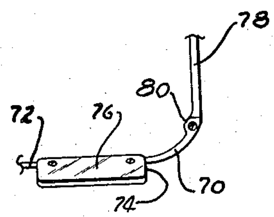
Figure 10 is a fragmentary plan view of another modification.

It will be observed that throughout their extent the straightline lens supports S are located below the lenses, i.e., aligned with the lower horizontal edges of the lenses, and that no portions of the outer edges of the lenses are embraced or engaged by these supports. As a result, lateral vision is in no way obstructed or impeded by any portions of the frame. In describing the supports S as being "straight-line" reference is made to the supports when viewed horizontally since when viewed vertically the supports are slightly curved at their ends as indicated at 20 (Figure 1) and 70 (Figure 10).

It will be further noted that the lens supports S are of greater length than the length of the lenses. As a result, a certain latitude in mounting of the lenses is had, permitting the lenses to be mounted on these supports at the selected distances apart to meet the interpupilary requirements of various individuals.

Figure 4:
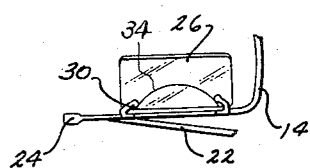
Figure 4 is a fragmentary front elevation explanatory of a modification.

Some people in certain occupations find it desirable to provide three degrees of correction, and for such people trifocal lenses have been developed. A presbyopic person of this type will want a correction for reading, and a correction for objects a few feet away on a desk or work bench, but no correction for distance vision. A modification for this purpose is shown in Figure 4 of the drawing, in which the lens 32 may have substantially the same external dimension as the lens previously described, but it is ground with two different corrections as indicated by the dividing line 34. The lower portion, of course, is used for close reading, and the upper portion for objects which are nearby but at somewhat greater distance. For distant vision the wearer looks over or alongside each end of the lens.

The frame need not be made of metal, and a modification showing a so-called shell frame, made of a plastics material, is illustrated in Figures 5, 6 and 7 of the drawing. Referring to these figures, the bridge portion is made of a top member 40 and side members 42. These rest on the sides of the nose, and may be molded with stationary pads, indicated at 44 in Figures 5 and 7. The lens support members 46 are generally straight and horizontal, and are preferably integral continuations of the bridge members 42. The temples are also made of plastics material, and may be hinged to the parts 46 in conventional fashion as indicated at 50.

In this case, the lenses are secured in position without the use of screws. More specifically, each support member 46 is grooved along its top edge to receive its lens 52. The grooves are preferably disposed at an angle in order to hold the lens at a corresponding angle, as is best shown in Figure 7. It will be understood that the lens may be, and preferably is, cemented in the groove.

If desired, the lens may be additionally secured by inserting and cementing its inner edge in a groove on the outside of the bridge members 42. This is indicated by the dotted line shown at 54 in Figure 6. As a matter of appearance rather than function, the outer edges of the lens in such case may be cut at an angle conforming to the angle of the bridge pieces 42, as is indicated at 56 in Figure 6.

It is not essential to insert the lens in a groove, nor to carry the inside edge of the lens to the bridge, and a modification which illustrates this fact is shown in Figures 8 and 9 of the drawing. Referring to those figures, the frame may be made of a plastics material, and may be somewhat similar to the frame shown in Figures 5, 6 and 7 except for the manner in which the lens is secured to the frame. In Figures 8 and 9 it will be seen that the rear face 60 of the horizontal lens support member 62 is shaped at an angle conforming to the desired angle of the lens 64. The latter has holes at two spaced points near its bottom edge, and screws 66 pass through the holes and are threadedly received in the support member 62. In this case, the lens 64 is rimless at the top and both side edges, much as in the case of Figures 1–4.

If desired, more than two holes may be provided in the support member 62 for the screws 66, and two additional holes are shown at 68 in Figure 9. This makes it possible to mount the lens 64 further from the bridge of the frame, thereby accommodating a patient having a greater interpupilary distance.

It will be understood that the simple screw mounting shown in Figures 8 and 9 may also be used with a metal frame. In one such frame I employ metal about 1/32" by 3/32" in cross section for the lens supports, and the lenses are screwed to the flat back face of the supports. The supports have the same angle as the lenses, instead of being cut away as in Figure 8.

If desired, the generally horizontal lens support members which extend outwardly to the temples may be curved rearward when viewed in plan, thus bringing the hinge portion back out of the line of sight when looking downward at the side of the lens. Such a modification is shown in Fig. 10, which is a fragmentary plan view similar to the righthand portion of Fig. 1, but showing how the endmost part 70 of the horizontal lens support member 72 may be bent rearwardly around the upper cheek portion of the face of the wearer, beyond the end 74 of the lens 76. The temple 78 remains hinged to the horizontal support member 72 by means of a conventional hinge or pivot 80.

This rearward curving of the horizontal support member is applicable to a shell frame as well as a metal frame. For example, in Fig. 9 it will be seen that the horizontal support member 62 projects for a substantial distance beyond the end of the lens 64. This outwardly projecting part may, if desired, be curved rearward, much as is shown in Fig. 10 for a metal frame.

It is believed that the construction and method of use of my improved eyeglasses, as well as the advantages thereof, will be apparent from the foregoing detailed description. There is no obstruction to vision at the top edges of the lenses. There is also considerable clearance at the sides of the lenses. Reading is facilitated because the lenses are generally perpendicular to the line of sight when reading. Greater clearance is provided above the lenses for distant vision. The eyeglasses are comfortable to wear also because of their light weight.

It will be understood that a plastic frame, such as that shown in Figures 5–9, may be provided with movable pads instead of stationary pads, if desired, and, conversely, that a metal frame, such as that shown in Figures 1–3, may be provided with stationary pads. It will also be understood that a plastic frame need not be made wholly of plastic. For example, the bridge portion may be a combination of metal and plastic, as is already known with some frames in common use, or the entire bridge portion may be made of metal while the horizontal support members may be made of plastic. The temples may be made of metal or plastic. The temples may be of the pressure type or of the hooked type, and for that matter it is not essential to use temples at all, for the bridge may be clamped on the nose as with pince nez glasses.

It will therefore be understood that while I have shown and described my invention in several preferred forms, changes may be made in the structures shown without departing from the scope of the invention, as sought to be defined in the following claims. In the claims the statement that the lens is secured above the lens support is intended to apply to the construction shown in Figure 8, as well as those shown in Figures 2, 4 and 7.

I claim:

1. Eyeglasses comprising a frame having a bridge of unusually great depth provided with side members, opposite horizontally extending elongated arms at the ends of said side members, said arms lying throughout their extent in a single horizontal plane well below the eye level, temples hinged to the outer ends of said arms, and lenses having straight lower edges and secured along said edges to said arms in close proximity to the side members of the bridge, each lens being shorter in horizontal length than the arm on which it is supported and being sufficiently narrow in vertical dimension to lie in its entirety below the eye level, whereby the wearer has unobstructed vision over the tops of said lenses and also in the regions adjacent to and above said temple hinges.

2. Eyeglasses as set forth in claim 1, said lenses being supported upon said arms so as to slant forwardly upward therefrom.

3. Eyeglasses as set forth in claim 1, said arms being provided with lens fastening formations so located that the lenses may engage therewith at selectively different distances from each other, thus providing for variations in interpupilary distances.

4. Eyeglasses as set forth in claim 1, said arms being provided with a plurality of fastener-receiving holes so located that said lenses may be secured to said arms at selected positions therealong.

References Cited in the file of this patent

UNITED STATES PATENTS

| | | |
|---|---|---|
| 732,251 | Applegate | June 30, 1903 |
| 1,164,145 | Tate | Dec. 14, 1915 |
| 2,374,171 | Breuker | Apr. 24, 1945 |
| 2,574,896 | Tanis | Nov. 13, 1951 |

FOREIGN PATENTS

| | | |
|---|---|---|
| 6,692 | Great Britain | of 1834 |
| 16,123 | Great Britain | of 1895 |
| 11,580 | Great Britain | of 1909 |